United States Patent Office 3,663,637
Patented May 16, 1972

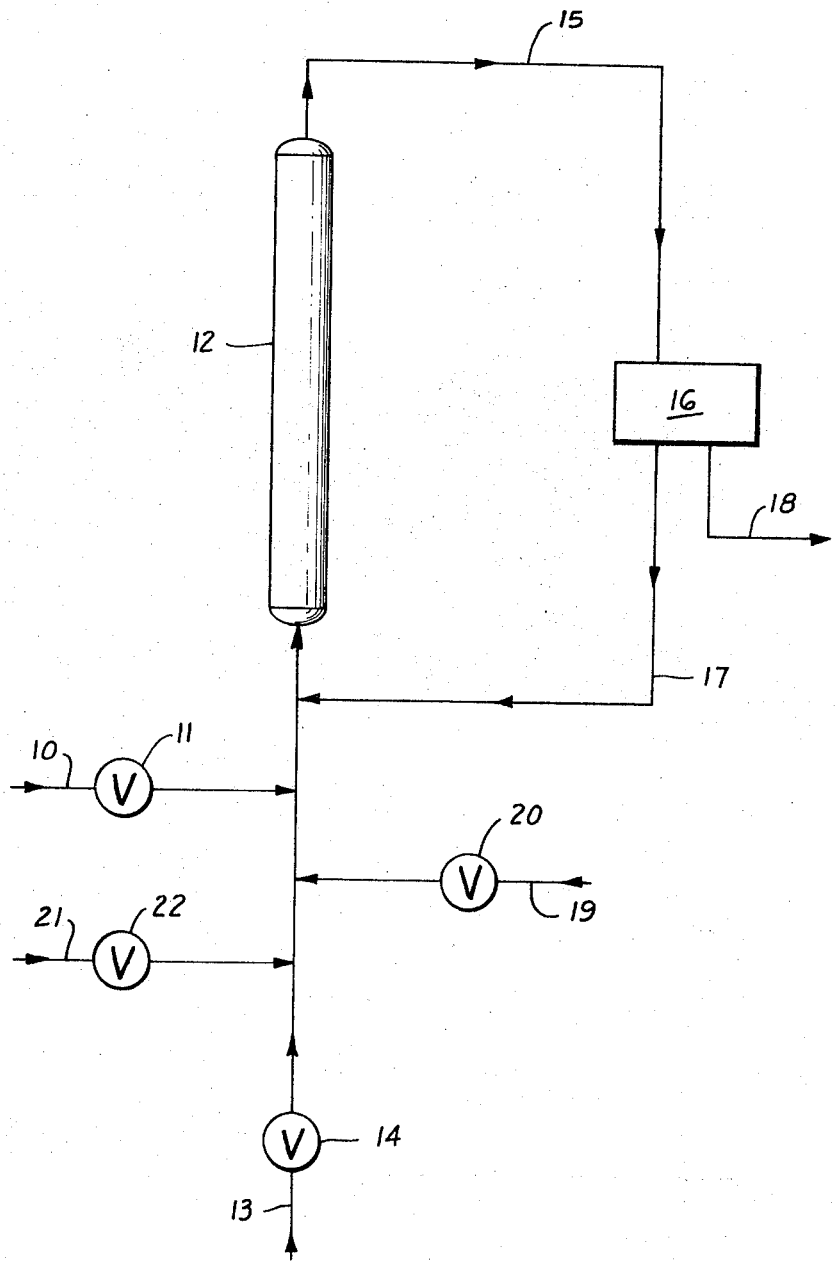

3,663,637
START-UP METHOD FOR HYDROGENATION
PROCESS
William G. Juhl, Seabrook, and Jacques D. Robinson
and John G. Trafton III, Alvin, Tex., assignors to
Monsanto Company, St. Louis, Mo.
Filed Apr. 23, 1970, Ser. No. 31,176
Int. Cl. C07c 7/00
U.S. Cl. 260—674 N                        8 Claims

ABSTRACT OF THE DISCLOSURE

A method for initiating a process wherein a naphthalene concentrate feed containing, as impurities, significant quantities of indenes, monoolefins and diolefins is selectively hydrogenated using a solid hydrogenation catalyst comprised of palladium or platinum on alumina comprising first contacting the catalyst with an inert liquid containing a major proportion of hydrocarbons, said inert liquid being one which does not hydrogenate under the process conditions, slowly admitting hydrogen, maintaining the inert liquid and hydrogen in contact with the catalyst until equilibrium amounts of hydrogen have accumulated on the catalyst and then introducing the naphthalene concentrate feed. The start-up procedure avoids the rapid temperature rises generally associated with the initiation of the hydrogenation process and substantially prevents hydrogenation of aromatic rings in the naphthalene concentrate feed.

BACKGROUND OF THE INVENTION

The present invention relates to a hydrogenation process. More particularly, the present invention relates to a start-up method in a process for the selective non-destructive hydrogenation of a naphthalene concentrate feed.

The selective hydrogenation of petroleum derived products in a non-destructive manner is well known and widely used throughout the oil and chemical industries. For example, selective hydrogenation is generally carried out to remove olefins and diolefins prior to any desulfurization process. This is necessary inasmuch as the removal of sulfur compounds from the feedstock requires high temperatures which would cause the olefins and diolefins to polymerize resulting in the fouling of heaters, heat exchangers and the desulfurization catalyst bed itself. Likewise, removal of olefins and diolefins is necessary before processing an aromatic rich feedstock through a thermal hydrodealkylation lest the high temperatures encountered therein cause the olefins and diolefins to polymerize with resulting fouling of the equipment. In the selective hydrogenation of feedstocks containing high proportions of aromatic compounds, the intent is to produce a product from which the economically more valuable aromatic hydrocarbons can be readily recovered by a suitable process such as solvent extraction. Solvent extraction readily lends itself to the separation of aromatic compounds such as benzene, naphthalene, etc., from paraffinic hydrocarbons, but this is not true of the separation of aromatic compounds from unsaturated components of the aliphatic or alicyclic type. Therefore, in order to facilitate the recovery of the more valuable aromatic components, the feedstock is subjected to a selective hydrogenation procedure wherein the above-mentioned unsaturated materials are saturated, thus making the product more amenable to separation into aromatic and non-aromatic fractions. Since it is the aromatic components which are the most sought after in the feedstock, it is important that the hydrogenation procedure hydrogenate only the aliphatic and alicyclic unsaturates and not the aromatic rings in the aromatic compounds.

It has been found that in the initiation of a process for the selective hydrogenation of a naphthalene concentrate feed, it frequently happens that when the concentrate and the hydrogen are first fed to the catalytic hydrogenation zone, there occurs a very rapid temperature rise resulting in conditions severe enough to effect hydrogenation of some of the aromatic rings present in the concentrate. This is an undesirable result inasmuch as it reduces the amount of aromatic product recoverable and furthermore, such rapid temperature runaways often result in cracking, the production of undesirable by-products, and catalyst fouling.

SUMMARY OF THE INVENTION

It is therefore an object of the present invention to provide an improved process for the selective hydrogenation of a naphthalene concentrate feed.

Another object of the present invention is to provide a start-up method for a process for the selective non-destructive hydrogenation of a naphthalene concentrate feed.

Still another object of the present invention is to provide a start-up method for use in a process for the selective hydrogenation of a naphthalene concentrate feed which prevents rapid temperature rises and hydrogenation of aromatic rings contained in the concentrate.

These and other objects of the present invention will become apparent from the drawing, the description given herein and the appended claims.

Basically, the process of the present invention provides a method whereby, in a selective hydrogenation of a naphthalene concentrate feed, hydrogenation of aromatic rings in the concentrate feed and temperature runaways are avoided on start-up of the process. According to the method, an inert liquid containing mainly hydrocarbons is introduced into the hydrogenation zone containing the solid hydrogenation catalyst prior to any introduction into the hydrogenation zone of the naphthalene concentrate feed. Following the introduction of the liquid, hydrogen is slowly admitted to the system and the mixture of the liquid and hydrogen are maintained in contact with the hydrogenation catalyst until an equilibrium amount of hydrogen has accumulated on the hydrogenation catalyst at which point the naphthalene concentrate feed is introduced into the system and the hydrogenation process commenced.

BRIEF DESCRIPTION OF THE DRAWING

The single figure is a diagrammatic representation of the process of the present invention.

DESCRIPTION OF THE PREFERRED EMBODIMENTS

As explained above, the start-up method of the present invention is an improvement in a selective hydrogenation process used in the treatment of naphthalene concentrate feeds. To illustrate that process and the improvement provided by the present invention, reference is made to the accompanying drawing. In the usual hydrogenation process, a naphthalene concentrate feed generally having an initial boiling point of around 350° F., a final boiling point of 550° F., a fifty percent boiling point of 450° F., an API gravity of around 9.6 and a bromine number of 30 is introduced by means of line 10 and valve 11 into reactor 12, valves 20 and 22 being closed. In accordance with the procedure by which the process is normally operated, the naphthalene concentrate feed is introduced into reactor 12 at the bottom to thereby provide upflow of the feed material therethrough. Within reactor 12, temperatures and pressure conditions are maintained such as to keep the naphthalene concentrate feed in the liquid phase during its passage through reactor 12. Normal temperatures within reactor 12 will generally range from about 100° to about 500° F., and preferably 170° to 380° F., whereas pressures will be within the range of 200 to 1000 p.s.i.g. and more preferably 250 to 60 p.s.i.g. The catalyst within reactor 12 will be one of the well-known solid hydrogenation catalysts such as a noble metal deposited on an alumina support.

Concurrently with the introduction of the naphthalene concentrate feed into reactor 12, hydrogen is also introduced into reactor 12 through a line 13 and valve 14. It is not necessary that the hydrogen stream in line 13 be pure hydrogen, but it is preferred that it be a stream containing at least 75 mole percent hydrogen. The amount of hydrogen introduced into reactor 12 varies somewhat depending on the hourly space velocity of the naphthalene concentrate feed being introduced and the general composition of the naphthalene concentrate feed.

In reactor 12, the indenes, olefins and diolefins present in the naphthalene concentrate feed are selectively hydrogenated to their saturated counterparts and a hydrogenated naphthalene concentrate product is removed overhead from reactor 12 through line 15 and passed to proportioning drum 16. In proportioning drum 16, the normal practice is to separate the naphthalene concentrate product into two fractions, one fraction to be recycled via line 17 to reactor 12, the remaining fraction passing through line 18 and valve 19 for further processing such as hydrofining.

In the process just described, it has been found that upon start-up, such as when the catalyst has been replaced and the process is put back into operation, or for that matter, when the process is started up for the first time in a new installation, sharp temperature rises or "temperature runaways" are encountered in reactor 12 with the result that significant quantities of the aromatic rings in the naphthalene concentrate feed are hydrogenated along with the olefins, diolefins and indenes. Since as explained above, it is the aromatic which are the most sought after products, this hydrogenation of aromatic rings represents significant economic loss in the process.

Referring again then to the accompanying drawing and in accordance with the start-up method proposed herein, valves 11 and 14 are closed with the result that no naphthalene concentrate feed or hydrogen is being introduced into the reactor initially. Reactor 12 is pressurized with an inert gas via line 21 and valve 22 to displace any air present therein. At this point, a predominately hydrocarbon containing liquid is introduced via line 19 and valve 20 into reactor 12, the liquid, under the pressure of the inert gas, being recycled through line 15, proportioning drum 16 and line 17 back into reactor 12. Valve 14 is then opened and hydrogen via line 13 is introduced into reactor 12 the inert gas bing displaced from the system by the hydrogen. The mixture of liquid and hydrogen is then maintained in contact with the catalyst by circulation through the system until an equilibrium amount of hydrogen has accumulated on the catalyst. At this point, valve 11 is opened which commences the flow of the naphthalene concentrate feed into reactor 12, and the start of the hydrogenation process. If necessary, the liquid which has entered the system via line 19 is removed downstream so that it poses no further problems in the processing of the product. In the circulation of the liquid and hydrogen through the system, no liquid need be removed from drum 16 via line 18 inasmuch as the feed of liquid via line 19 is not continuous. If, however, the feed of liquid via line 19 is continuous, there will be continuous removal of liquid through line 18.

As pointed out above, hydrogen is introduced into the mixture of liquid and inert gas within reactor 12 and the liquid and hydrogen then kept in contact with the catalyst until such catalyst contains thereon an equilibrium amount of hydrogen. The presence of equilibrium amounts of hydrogen on the catalyst is best discerned by the appearance of an exotherm in which there is a relatively sharp temperature rise or "kick," and which, depending on factors such as the activity and amount of catalyst present, may amount to a $\Delta T$ of from 25° to 5° F., or more. When this exotherm or "kick" has subsided, the hydrogenation process can be begun. In any event, the inert liquid is maintained in contact with the catalyst for a time sufficient to allow the temperature exotherm, if any, to subside.

Although as stated above, the reactor is first pressurized with an inert gas prior to introduction of the inert liquid, this is not necessary. Pressurizing the reactor with an inert gas is a safety measure to exclude air or oxygen from the reactor. However, this step may be accomplished simply by completely filling the system with the inert liquid in which case the air or oxygen is likewise excluded. When, however, an inert gas is used, which is the preferable method, it need be added only in an amount sufficient to displace any air or oxygen from the system and high pressures are not necessary. For example, pressures of between 10 and 200 pounds in the reactor are generally sufficient to ensure that any air or oxygen has been displaced. The amount of hydrogen fed to the system relative to the amount of inert liquid will be such as to provide from 100 to 500 s.c.f. per barrel of liquid and preferably 300 to 600 s.c.f. per barrel of liquid.

The term naphthalene concentrate feed refers to a generally higher boiling feed stock rich in naphthalene and alkyl naphthalenes and containing in significant quantities, as impurities, indenes, monoolefins, diolefins and other aliphatic and alicyclic unsaturates. Such feeds may generally be characterized in that they have an API gravity ranging from 8.5 to 12, a bromine number of from 15 to 35 and an ASTM distillation range as follows: an initial boiling point of from 350° to 415° F., a ten percent boiling point of from 415° to 440° F., a fifty percent boiling point of from 440° to 470° F., a ninety percent boiling point of from 470° to 500° F., and a final boiling point of from 500° to 550° F.

As noted above, the catalyst contained in the reactor can be any of the well-known solid hydrogenation catalysts. Although not absolutely necessary, it is generally preferred that porous, particle form supports be employed for the catalyst to adequately disperse and increase surface area of the actual catalytic agent. Such porous supports may take the form of natural or treated clays, such as fuller's earth, kaolin, bentonite; treated clay-like material, such as Celite and Sil-O-Cel; artificially prepared or synthetic materials, such as magnesium oxide, silica gel, alumina gel and the like; or the zeolites, activated carbon, diatomaceous earth, and the like. Activated alumina, which is a well-known crystalline alpha alumina monohydrate prepared by the partial dehydration of alpha alumina trihydrate is very satisfactory as a porous support. Another extremely desirable alumina support is chi alumina prepared by the precipitation of alpha alumina trihydrate from an aluminate solution below 140° F. The actual catalytic agent employed, can be any of the noble metals in Group VIII of the Periodic Table of Elements with atomic numbers of at least 27 such as rhodium, palladium and platinum; nickel either unsupported or on a known supporting material and the like. Preferably, because of their relatively high hydrogenation activity at low temperatures, palladium or platinum supported on various aluminas are preferred with a palladium on alumina support providing an especially desirable catalyst. When the catalyst does comprise one of the noble metals supported on alumina or other such supports, the noble metal will generally lie within the range of 0.1 to 5% and preferably to 0.2 to 1% by weight of catalyst.

The inert liquid chosen for contacting the catalyst prior to the introduction of the naphthalene concentrate feed can comprise any liquid which is not subject to or is substantially resistant to hydrogenation under the conditions existing in the reactor. Generally speaking, the inert liquid will be one containing a major proportion of hydrocarbons. Numerous hydrocarbons are suitable in this respect including the saturated aliphatic hydrocarbons, both branched and straight chain, the alicyclic saturated hydrocarbons such as cyclohexane, cycloheptane, and the aromatic hydrocarbons such as benzene, toluene, the xylenes, etc. The hydrocarbons present in the inert liquid can be pure or mixed. As will be recognized, there are an extremely large number of materials which fit into the above categories and which are suitable for use as the inert liquid in the present invention. It should be pointed out that the inert liquid need not be a saturated material but only need be resistant to hydrogenation under the conditions existing in the reactor. Thus, for example, aromatic hydrocarbons, as mentioned above, are suitable for use as the inert liquid inasmuch as under the normal hydrogenation conditions existing in the reactor, virtually no hydrogenation of the aromatic rings occurs. In the preferred case, the inert liquid will be a hydrogenated naphthalene concentrate product, i.e. a naphthalene concentrate feed having the properties described above which has been hydrogenated as per the normal process. The use of such as the inert liquid has the advantage that no further separation of inert liquid from product much be accomplished once the process has been put on stream. Furthermore, this minimizes possible side reactions, catalyst fouling, etc., which might be encountered if other liquids are chosen. Nonetheless, if desired, other liquids may be used as the inert liquid.

The term inert gas as used herein refers to a gas which is unreactive under the conditions of use in the process. More specifically, the term inert gas refers to one of the commonly used gases for blanketing, purging, etc. Included in this group may be mentioned the light hydrocarbon gases such as methane and ethane; nitrogen, argon, helium, $CO_2$, etc. Virtually any gas which does not react with the catalyst or the inert liquid can be used as a pressurizing medium in the start-up method. Usually, however, because of its availability and economy, nitrogen is chosen as the inert gas.

The contacting of the catalyst in the hydrogenation zone with the inert liquid and hydrogen is generally carried out at temperatures and pressures normally encountered under the actual hydrogenation process conditions. Most often, these temperatures will range from about 50° to about 500° F., and preferably from about 110° to about 380° F., whereas pressures will range from about 200 to about 1000 p.s.i.g. and more preferably 25 to 600 p.s.i.g. The liquid hourly space velocity of the inert liquid in the reactor when it is being recycled through the system while the hydrogen accumulates on the catalyst is not critical and can range from 0.5 to 5 and higher.

The following example which is given by way of illustration and not by limitation demonstrates the utility of the start-up method of the present invenion. The hydrogenated naphthalene concentrate product used was the hydrogenated product of a naphthalene concentrate feed having the following properties:

ASTM Distillation, ° F.
```
    Initial boiling point _____ 401
    10% boiling point _____ 430
    50% boiling point _____ 449
    90% boiling point _____ 494
    End of point _____ 528
API gravity _____ 9.6
Bromine number _____ 24.5
```

EXAMPLE

Using a system quite similar to that described above and as shown in the accompanying drawing, a reactor having therein a solid hydrogenation catalyst comprised of an alumina support and containing 0.3 weight percent palladium was pressured up with nitrogen to between 90 and 100 p.s.i.g. At this point, a stream of hydrogenated naphthalene concentrate product was admitted to the reactor. Following this, hydrogen was then admitted to the reactor and the hydrogenated naphthalene concentrate product was continuously circulated through the system. A moderate temperature rise of about 35° F. was noted following the addition of the hydrogen. After this initial moderate temperature kick had subsided, the system was brought up to normal reaction temperatures and normal hydrogen flow established. Naphthalene concentrate feed was then admitted to the reactor and the actual hydrogenation reaction begun. No excessive temperature rise was noted upon the admission of the naphthalene concentrate feed and subsequent analysis of the product indicated substantially no hydrogenation of the aromatic rings contained in the feed.

What is claimed is:

1. In a process for the selective non-destructive hydrogenation of a naphthalene concentrate feed containing as impurities significant quantities of indenes, olefins and diolefins wherein said naphthalene concentrate feed in the liquid phase and hydrogen are introduced into a hydrogenation zone containing a solid hydrogenation catalyst, the improvement whereby saturation of aromatic rings in said naphthalene concentrate feed and excessive temperatures are prevented in the initiation of said process, said improvement comprising contacting said hydrogenation catalyst prior to the introduction into said hydrogenation zone of said naphthalene concentrate feed with a hydrogenated naphthalene concentrate admitting hydrogen to said hydrogenation zone and maintaining said hydrogenated naphthalene concentrate and said hydrogen in contact with said catalyst for a period of time sufficient to allow any temperature exotherms to subside.

2. The process of claim 1 wherein said catalyst comprises a noble metal selected from the group consisting of palladium and platinum supported on alumina.

3. The process of claim 1 wherein said hydrogenated naphthalene concentrate and said hydrogen are maintained in contact with said catalyst at a temperature of from about 50° to about 500° F.

4. The process of claim 3 wherein said hydrogenated naphthalene concentrate and said hydrogen are maintained in contact with said catalyst at a pressure of from about 200 to 1000 p.s.i.g.

5. The process of claim 1 wherein said naphthalene concentrate feed has a boiling point range substantially within the range of about 375° to about 550° F.

6. The process of claim 1 wherein an inert gas is used to pressurize said hydrogenation zone prior to the introduction of said hydrogenated naphthalene concentrate.

7. The process of claim 6 wherein said inert gas is nitrogen.

8. The processss of claim 1 wherein said hydrogenated naphthalene concentrate and said hydrogen are maintained in contact with said catalyst at a temperature of from about 110° to about 380° F.

References Cited
UNITED STATES PATENTS

| | | | |
|---|---|---|---|
| 2,953,519 | 9/1960 | Bercik et al. | 208—255 X |
| 3,277,199 | 10/1966 | Poll | 260—674 N |
| 3,493,492 | 2/1970 | Sze | 208—255 |

DELBERT E. GANTZ, Primary Examiner

C. E. SPRESSER, JR., Assistant Examiner

U.S. Cl. X.R.

208—255; 260—674 H

UNITED STATES PATENT OFFICE
CERTIFICATE OF CORRECTION

Patent No. 3,663,637                         Dated May 16, 1972

Inventor(s) WILLIAM G. JUHL ET AL

It is certified that error appears in the above-identified patent and that said Letters Patent are hereby corrected as shown below:

Column 4, line 2, change "5°F" to -- 50°F --

Column 5, line 21, change "much" to --must-- line 45, change "25" to --250--

Signed and sealed this 2nd day of January 1973.

(SEAL)
Attest:

EDWARD M. FLETCHER, JR.          ROBERT GOTTSCHALK
Attesting Officer                Commissioner of Patents